(12) United States Patent
Venkatesh et al.

(10) Patent No.: US 11,652,871 B1
(45) Date of Patent: May 16, 2023

(54) PROVIDING ACCESS TO FUNCTIONALITY OF A WEB APPLICATION VIA MICROAPPS

(71) Applicant: Dell Products L.P., Round Rock, TX (US)

(72) Inventors: Ramanujam Kaniyar Venkatesh, Bangalore (IN); Sudhakar Ramasamy, Salem (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/047,975

(22) Filed: Oct. 19, 2022

(51) Int. Cl.
*H04L 67/10* (2022.01)
*G06F 3/04842* (2022.01)
*H04L 67/02* (2022.01)

(52) U.S. Cl.
CPC .......... *H04L 67/10* (2013.01); *G06F 3/04842* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 10,949,217 B1 * | 3/2021 | Nitsopoulos | G06F 9/44521 |
| 11,354,122 B2 * | 6/2022 | Singh | G06F 9/44505 |
| 11,368,373 B2 * | 6/2022 | Singh | G06F 9/445 |
| 11,429,400 B2 * | 8/2022 | Silvert | G06F 9/451 |
| 2019/0069124 A1 * | 2/2019 | Labrecque | G06F 9/541 |
| 2021/0329081 A1 * | 10/2021 | Singh | H04L 67/01 |

* cited by examiner

*Primary Examiner* — Quang N Nguyen
(74) *Attorney, Agent, or Firm* — Kirton McConkie; Brian Tucker

(57) ABSTRACT

Access to functionality of a web application can be provided via microapps. A microapp platform can include a microapp orchestrator that administrators may use to create and deploy microapps. A microapp may include a simple user interface with one or more elements that are associated with a function of a web application. When the microapp is deployed to a user computing device, the user can use the elements of the microapp's user interface to invoke the function of the web application without needing to directly interact with the web application.

20 Claims, 10 Drawing Sheets

PROVIDING ACCESS TO FUNCTIONALITY OF A WEB APPLICATION VIA MICROAPPS

CROSS-REFERENCE TO RELATED APPLICATIONS

N/A

BACKGROUND

Web applications typically require a substantial amount of time to load and involve many navigation steps to perform a task. For example, a user typically must launch a browser window, navigate to the URL where the web application is hosted, and then perform authentication before the web application will be loaded. Once the web application is loaded the user oftentimes must navigate to the page of the web application where the desired functionality is provided and then invoke the functionality. If the user performs the functionality repeatedly throughout the day, he or she may lose significant productivity repeating these steps.

The use of a web application may also be complicated when a user uses different device types to access the web application. For example, although a web application may be adjusted to a device's resolution, the web application is still arranged in the same manner on desktops, laptops, tablets, smart phones, etc. The arrangement of a web application may typically be tailored to desktop devices thereby degrading the user experience on a tablet or smart phone.

A web application is also typically created by a third party and provided to end users in the same form. The end users, or the organizations for which the end users work, have little or no control over how the web application's user interface is formatted or functions.

Similarly, an organization may desire to integrate functionality of one web application into another web application. Yet, this would likely only be possible if the provider of the web application configures the web application to use REST APIs exposed by the other web application. The organization itself will not be able to make such configurations.

BRIEF SUMMARY

The present invention extends to systems, methods and computer program products for providing access to functionality of a web application via microapps. A microapp platform can include a microapp orchestrator that administrators may use to create and deploy microapps. A microapp may include a simple user interface with one or more elements that are associated with a function of a web application. When the microapp is deployed to a user computing device, the user can use the elements of the microapp's user interface to invoke the function of the web application without needing to directly interact with the web application.

In some embodiments, the present invention may be implemented as a method for providing access to functionality of a web application via microapps. A microapp orchestrator can receive user interface creation input for defining a user interface of a first microapp. The microapp orchestrator can receive input that defines an association between one or more elements of the user interface of the first microapp and a first function of a first web application that is accessible via an interface of the first web application. The microapp orchestrator can create the first microapp by storing the user interface of the first microapp and the association between the one or more elements of the user interface of the first microapp and the first function of the first web application. The microapp orchestrator can deploy the first microapp to a first user computing device to thereby allow a first user of the first user computing device to access the first function of the first web application by selecting the one or more elements of the user interface of the first microapp.

In some embodiments, the present invention may be implemented as computer storage media storing computer executable instructions which when executed implement a method for providing access to functionality of a web application via microapps. A microapp orchestrator can receive user interface creation input for defining a user interface of a first microapp. The microapp orchestrator can receive input that defines an association between an element of the user interface of the first microapp and a first function of a first web application that is accessible via a REST API of the first web application. The microapp orchestrator can create the first microapp by storing the user interface of the first microapp and the association between the element of the user interface of the first microapp and the first function of the first web application. The microapp orchestrator can deploy the first microapp to a first user computing device to thereby allow a first user of the first user computing device to access the first function of the first web application by selecting the element of the user interface of the first microapp.

In some embodiments, the present invention may be implemented as a system that includes a microapp platform that hosts a microapp orchestrator and a microapp database and a plurality of user computing devices. The microapp orchestrator can be configured to perform to provide access to functionality of one or more web applications via microapps. The microapp orchestrator can receive user interface creation input for defining a user interface of a first microapp. The microapp orchestrator can receive input that defines an association between one or more elements of the user interface of the first microapp and a first function of a first web application that is accessible via an interface of the first web application. The microapp orchestrator can create the first microapp by storing the user interface of the first microapp and the association between the one or more elements of the user interface of the first microapp and the first function of the first web application. The microapp orchestrator can deploy the first microapp to a first user computing device of the plurality of user computing devices to thereby allow a first user of the first user computing device to access the first function of the first web application by selecting the one or more elements of the user interface of the first microapp.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
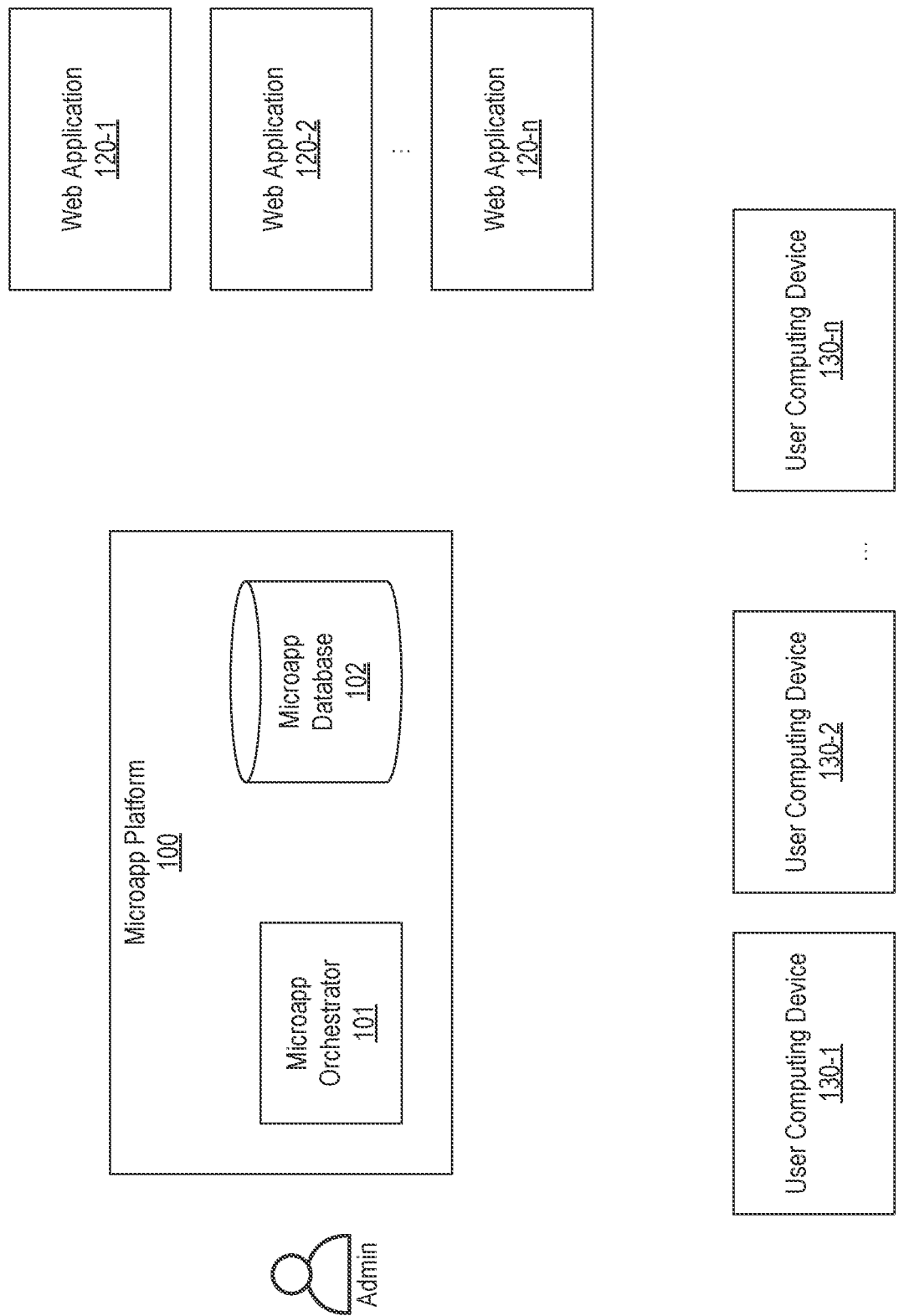
FIG. 1 provides an example of a computing environment in which embodiments of the present invention may be implemented.

FIG. 1 provides an example of a computing environment in which embodiments of the present invention may be implemented. This computing environment includes a microapp platform 100, web applications 120-1 through 120-n (collectively web applications 120), and user computing devices 130-1 through 130-n (collectively user computing devices 130). Microapp platform 100 can include a microapp orchestrator 101 that is configured to perform the functionality described herein to provide access to functionality of at least one of web applications 120-1 through 120-n via microapps. Microapp platform 100 can also include a microapp database 102 in which microapps can be stored.

In the context of the present application, a microapp is a simple user interface that allows a user to access a specific function of a web application without directly interacting with the web application. For example, if the web application is a banking application/website, a microapp for the banking application/website could be a single HTML-based webpage that allows the user to only obtain a current balance. Because a microapp provides access to a simple function of a web application, the user can access the simple function easily, quickly, and conveniently.

Web applications 120 can represent any browser-based application that provides a full set of features and functionality for use by users of user computing devices 130. As a few examples only, web applications 120 could be ServiceNow, Concur, MyWorkDay, etc. Accordingly, when embodiments of the present invention are not provided, users of user computing devices 130 could access functionality of web applications 120 by launching a browser, navigating to the proper URL, logging in, navigating to the webpage/interface where the desired functionality is provided, and then invoking the functionality. In contrast, when embodiments of the present invention are provided, the users will be able to invoke such functionality directly from a microapp without interfacing directly with web applications 120.

User computing devices 130 can represent any type of computing device that a user may use such as a desktop, laptop, thin client, tablet, smart phone, etc. In some embodiments, user computing devices 130 may be those of an enterprise and may be managed by an administrator.

Figure 2A:
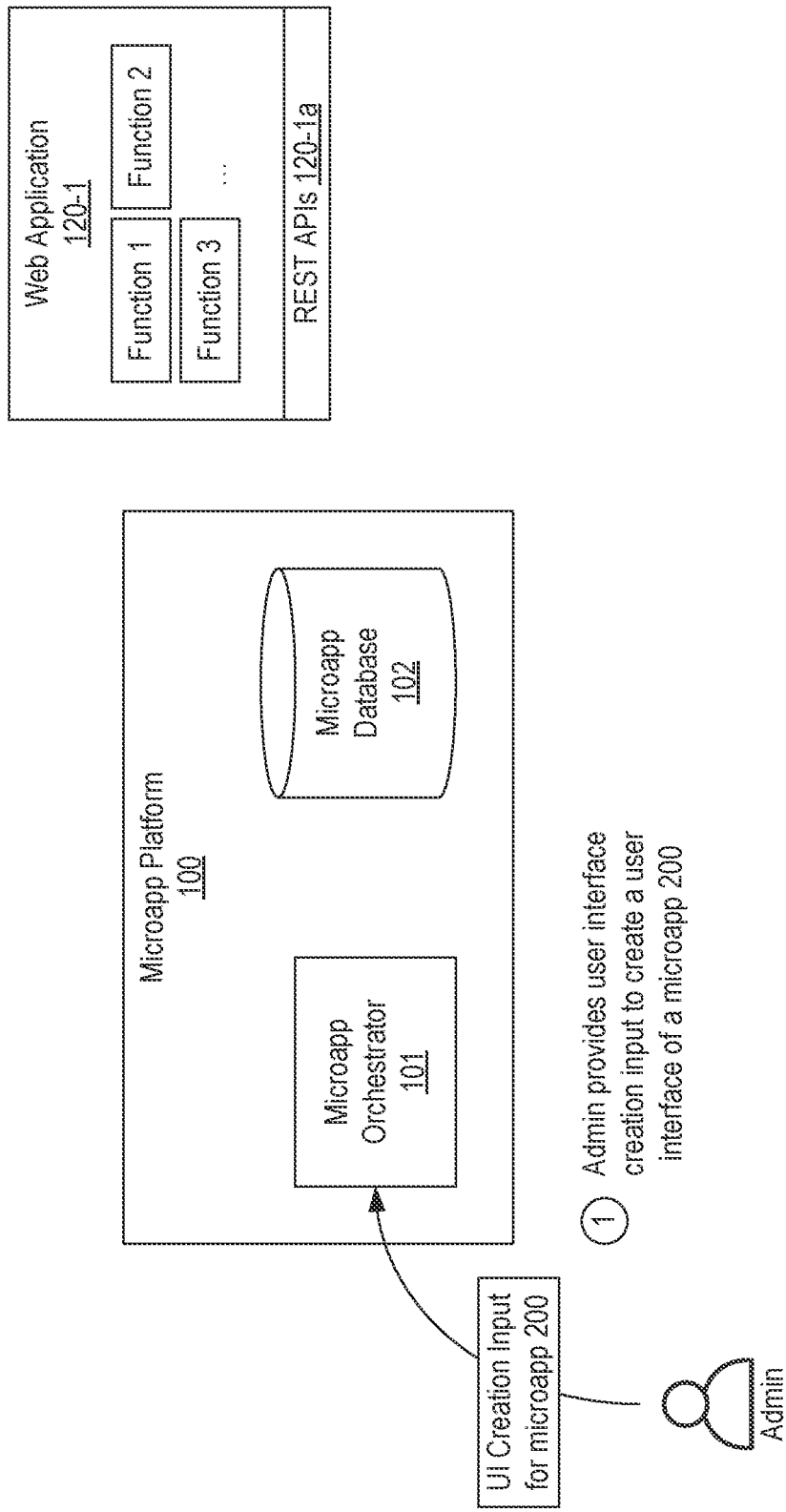
FIGS. 2A-2C provide an example of how a microapp can be created in accordance with one or more embodiments of the present invention.
Figure 2B:
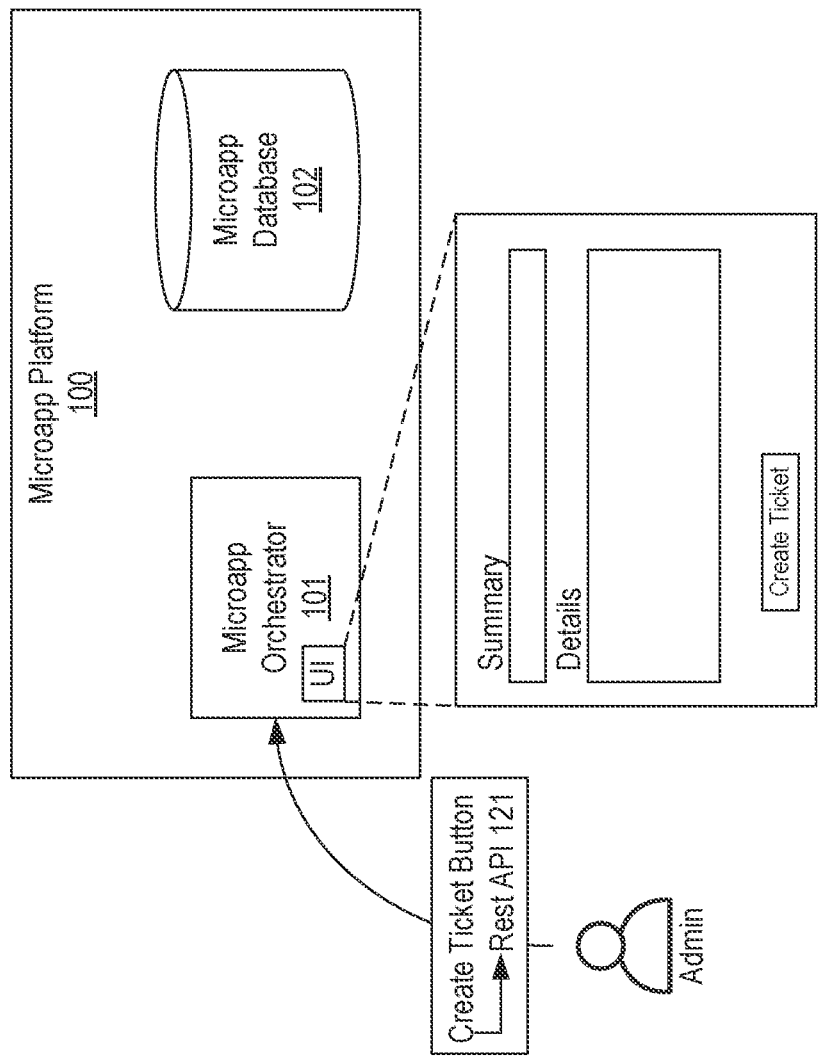
Figure 2C:
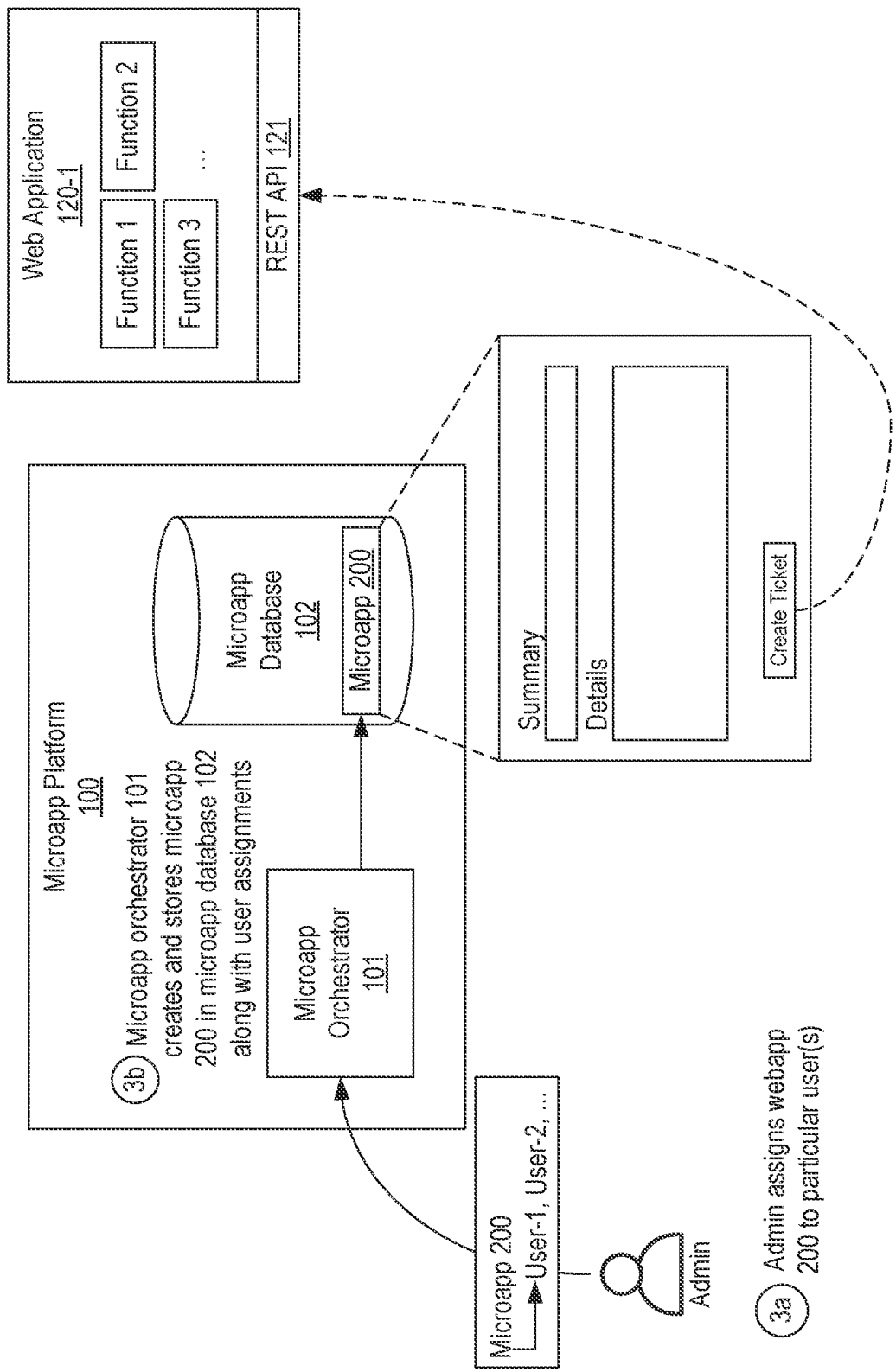

FIGS. 2A-2C provide an example of how a microapp can be created in accordance with one or more embodiments of the present invention. Typically, an administrator could create a microapp for one or more users that he or she manages. Oftentimes, the administrator would customize the microapp to a specific group of users (e.g., for a group of employees that use a web application in the same or similar manner). However, a microapp could be created for and used by any number and/or type of users and for any purpose.

Turning to FIG. 2A, it is assumed that an administrator has accessed microapp orchestrator 101 to create a microapp 200 such as by navigating to a webpage where microapp orchestrator 101 is hosted and logging in. Then, in step 1, the administrator can provide user interface (UI) creation input for microapp 200. For example, the administrator could input HTML defining a single, simple webpage to serve as the user interface for microapp 200. In this example, it is assumed that microapp 200 is intended to provide access to ticket creation functionality of web application 120-1. As represented in FIG. 2B, web application 120-1 can provide many different functions and the ticket creation functionality is just one such function. It is also assumed that web application 120-1 provides a REST API 121 by which the ticket creation functionality may be invoked.

Turning to FIG. 2B, it is assumed that the administrator's user interface creation input defines a webpage having two text boxes and a button. At this point, it is assumed that the administrator has not yet defined what such elements of the user interface of microapp 200 should do. Therefore, in step 2, the administrator can provide input to microapp orchestrator 200 defining an association between the element(s) of the user interface of microapp 200 and a REST API of one of web applications 120. For example, the administrator could provide input defining that the selection of the create ticket button should invoke REST API 121 to provide the content of the two text boxes (i.e., the summary and details of the ticket to be created) to the ticket creation functionality of web application 120-1.

Turning to FIG. 2C, in step 3a, the administrator may also provide input assigning microapp 200 to one or more users. For example, the administrator could be creating microapp 200 to be used by employees within an IT department that routinely create tickets. In the depicted example, it is assumed that the administrator assigns microapp 200 to User-1 among other users. In step 3b, which need not be performed after step 3a, microapp orchestrator 101 can create and store microapp 200 in microapp database 102 along with any user assignments. For example, microapp orchestrator 101 could store microapp 200 in microapp database 102 in the form of an HTML file and may maintain metadata defining each user to whom this HTML file should be made available. As represented in FIG. 2C, microapp 200 includes the simple interface comprised of two text boxes and a button, and is configured so that the selection of the button will call REST API 121 to invoke web application 120-1's ticket creation functionality.

Notably, the administrator (or other administrator(s)) could create one or more additional microapps for invoking the ticket creation functionality of web application 120-1 but using a different user interface that may be better suited for other users. Similarly, the administrator could create additional microapps for invoking other functions of web application 120-1 or functions of other web applications. In short, any number of microapps could be created to provide quick, easy, and convenient access to functionality of web applications 120 without having to interact directly with web applications 120.

Figure 3A:
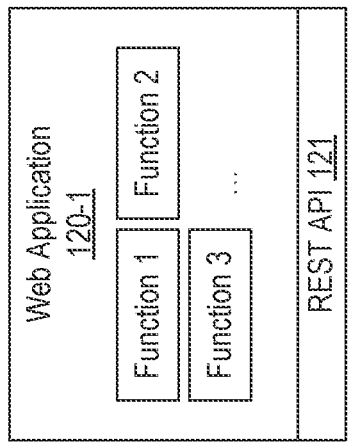
FIGS. 3A-3E provide an example of how a microapp can be used to access functionality of a web application in accordance with one or more embodiments of the present invention.
Figure 3A:
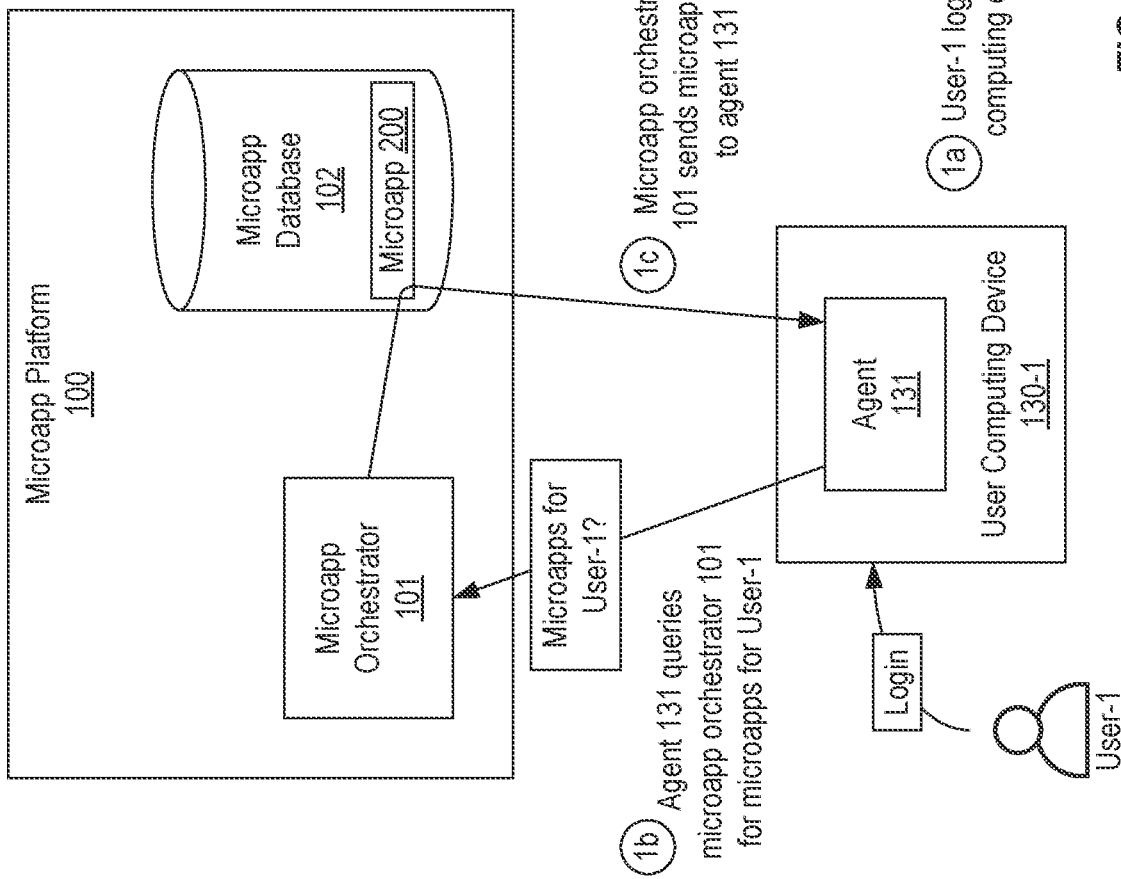

FIGS. 3A-3E provide an example of how microapp 200 can be used to access functionality of web application 120-1 in accordance with one or more embodiments of the present invention. Turning to FIG. 3A, in step 1a, it is assumed that User-1 logs in to user computing device 130-1. In step 1b, an agent 131 executing on user computing device 130-1 can identify User-1 as the logged in user and can query microapp orchestrator 101 for any microapps that should be made available to User-1. In step 1c, microapp orchestrator 101 can access microapp database 102 to determine that microapp 200 is assigned to User-1 and can therefore deliver microapp 200 to agent 131 (along with any other microapp that may be assigned to User-1).

Figure 3B:
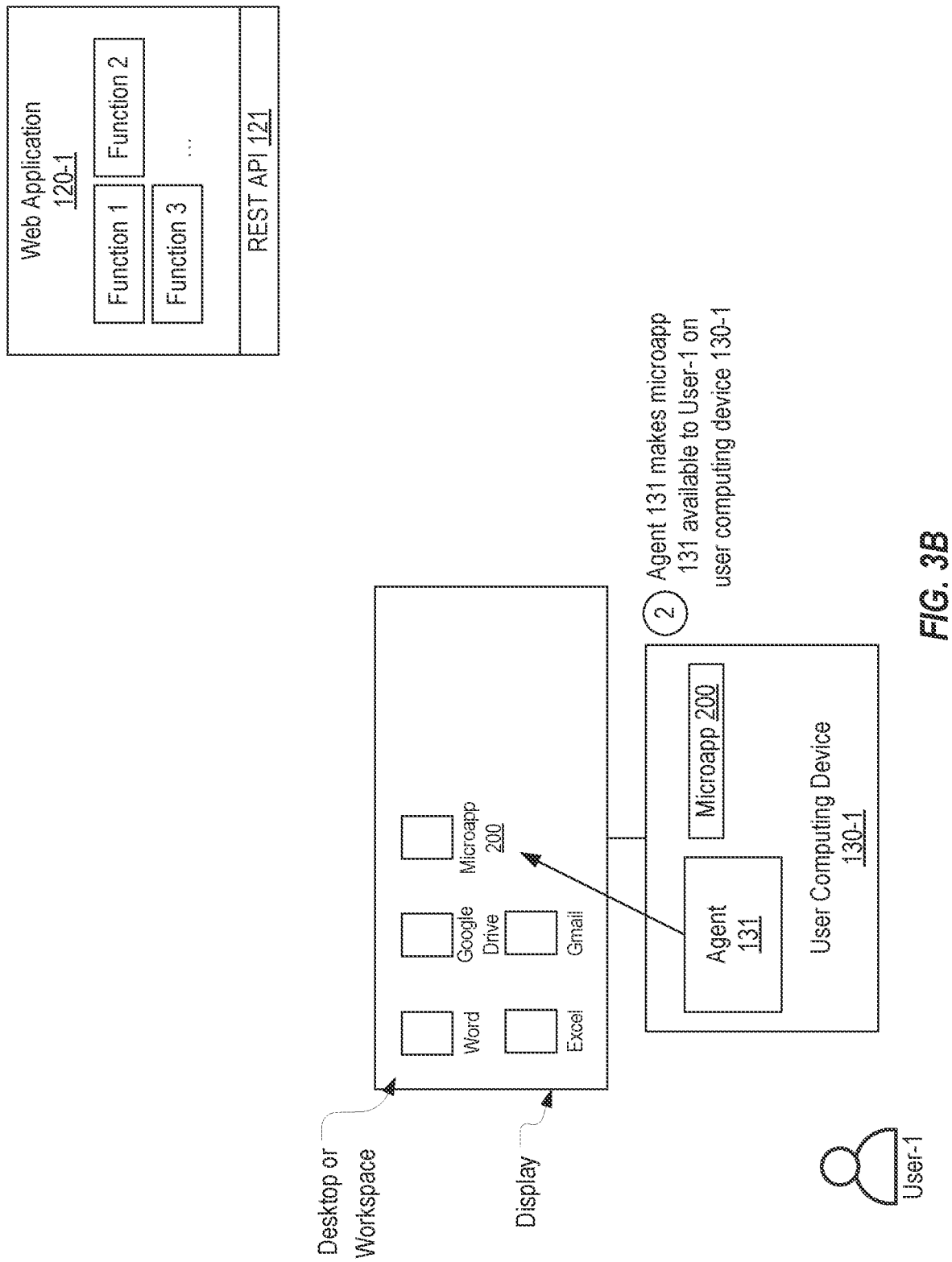

Turning to FIG. 3B, in step 2, agent 131 can make microapp 200 available to User-1 on user computing device 130-1. For example, in some embodiments, agent 131 could generate or update a desktop or workspace to include an icon for microapp 200. In embodiments where a workspace is provided on user computing device 130-1, agent 131 could render the user interface of microapp 200 as part of the workspace. In this context, a workspace refers to an environment/interface in which the user can seamlessly access applications and data available across public and/or private clouds and locally. For example, the workspace may appear similar to a desktop but may be managed/generated by agent 131 and could therefore be modified to integrate microapp 200's rendered user interface in the workspace itself. In this way, the user would not need to launch microapp 200 but would have immediate access to the text boxes and ticket creation button.

In some embodiments, as part of making a microapp available to a user, agent 131 can also perform single sign-on to authenticate the user for accessing the web application wo which the microapp corresponds. For example, in conjunction with making microapp 200 available to User-1, agent 131 could perform single sign-on to authenticate User-1 with web application 120-1.

Figure 3C:
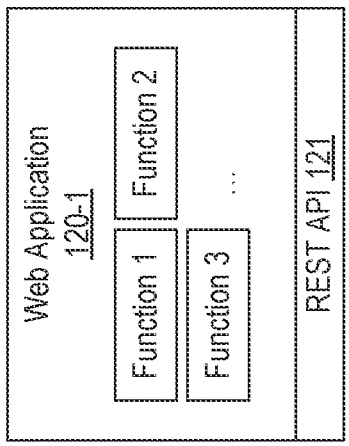
Figure 3C:
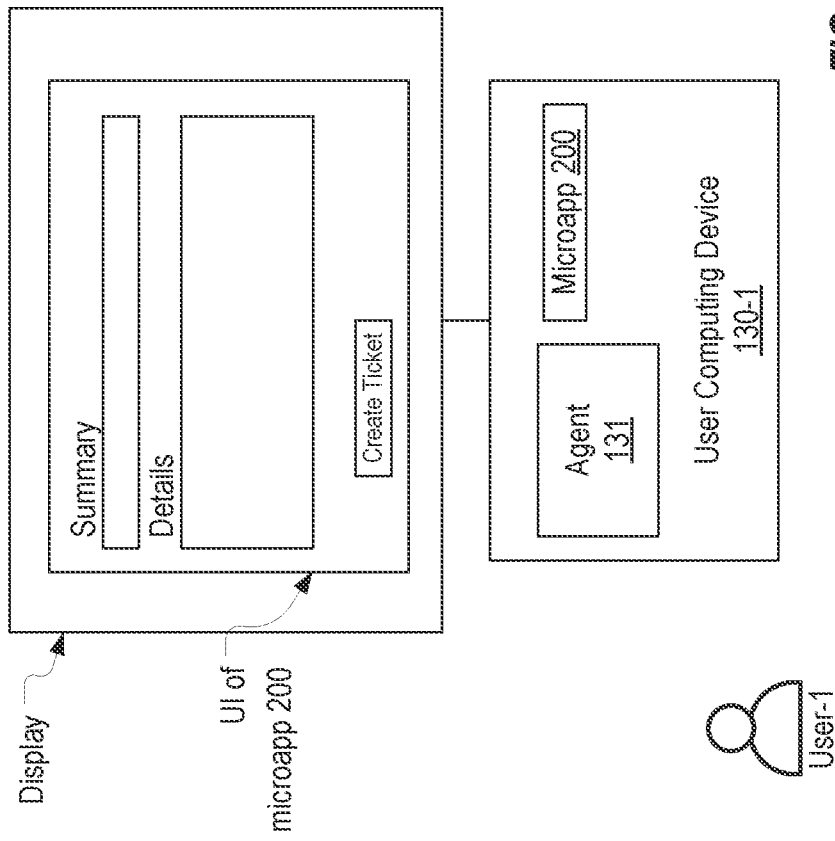

Turning to FIG. 3C, it is now assumed that, in step 3, the user interface of microapp 200 is displayed on user computing device 130-1 (e.g., in response to User-1 selecting the icon for microapp 200 or as a result of the user interface being directly integrated into a workspace displayed on user computing device 130-1). Notably, User-1 is able to reach the user interface of microapp 200, or in other words, to gain access to the ticket creation functionality of web application 120-1, by simply invoking microapp 200 and without any navigation.

Figure 3D:
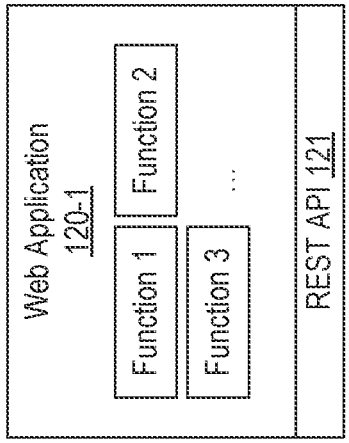
Figure 3D:
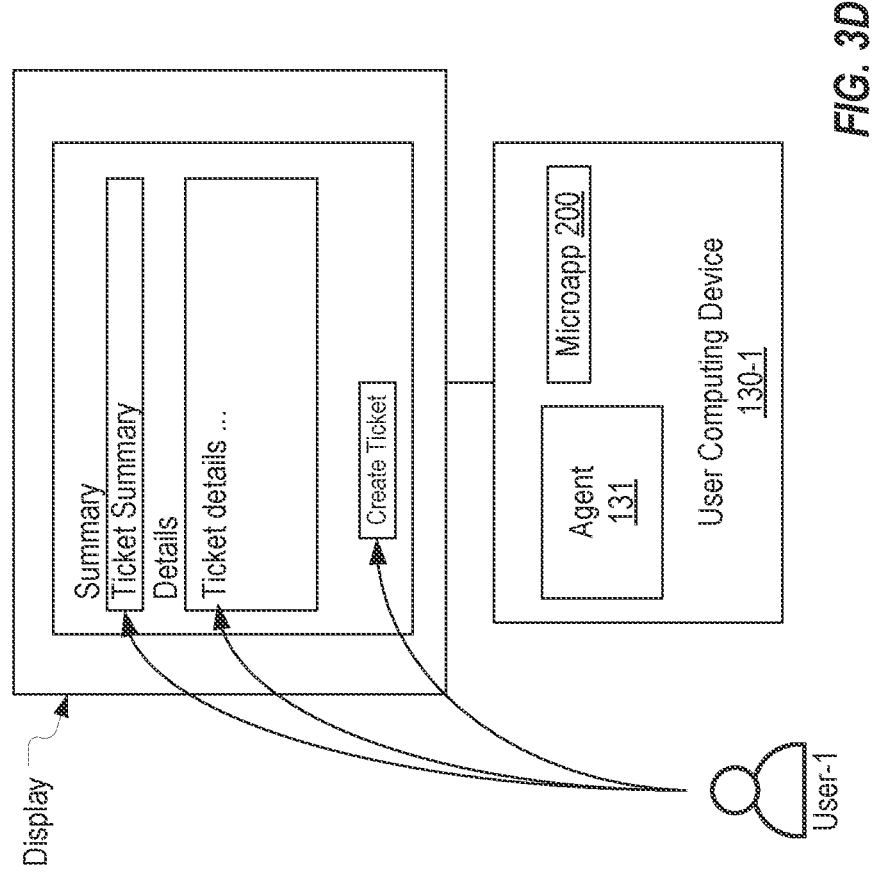

Turning to FIG. 3D, in step 4, User-1 provides input to the user interface of microapp 200. For example, User-1 may type a summary and details for a ticket to be created and may then select the create ticket button.

Figure 3E:
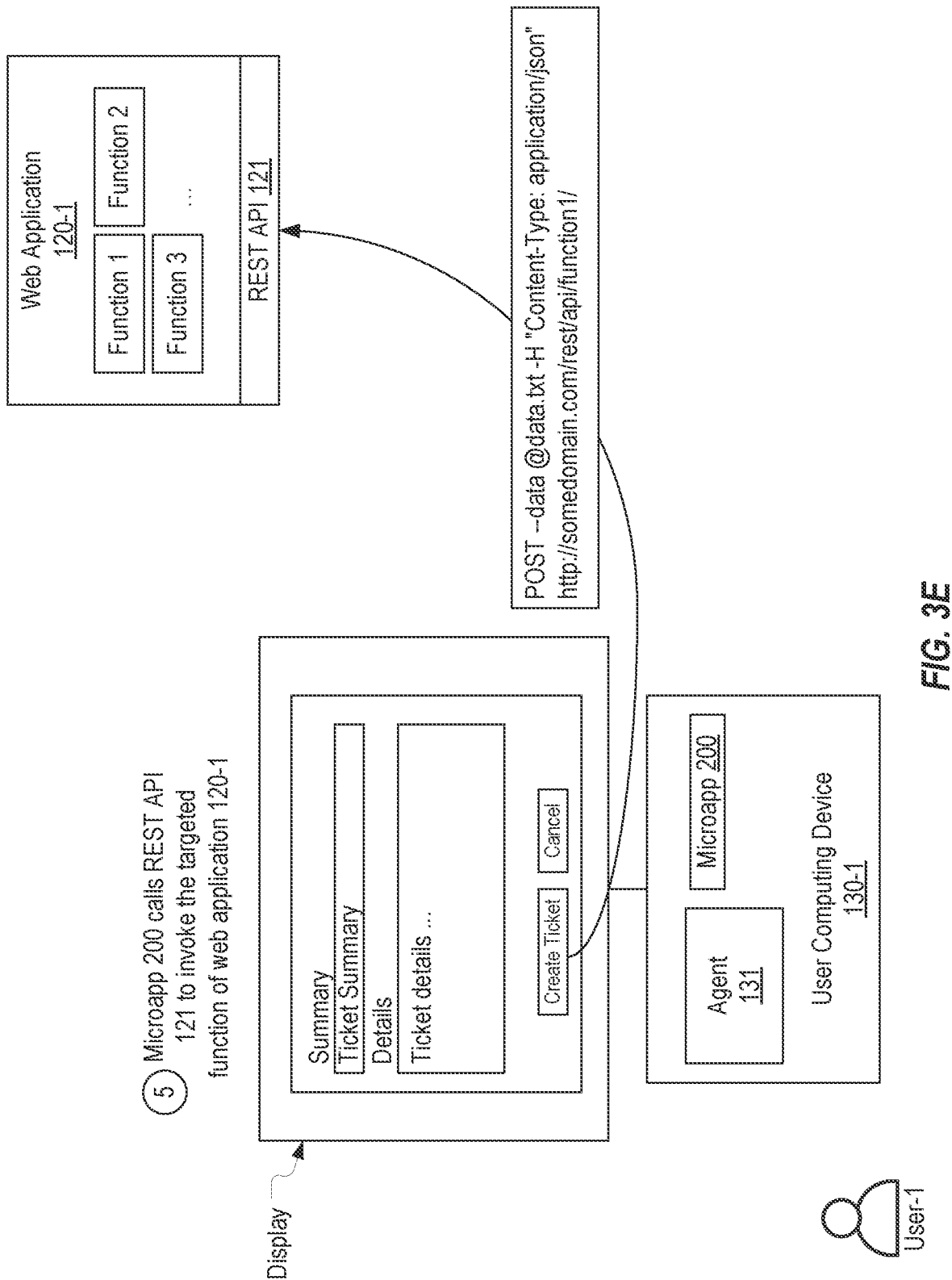

Turning to FIG. 3E, in step 5 and in response to the user's input to its user interface, microapp 200 can invoke the targeted function of web application 120-1. In this example, microapp 200 may generate an HTTP Post request that targets REST API 121 and provides the content of the two text boxes to the ticket creation functionality (function 1) of web application 120-1. Although not shown, microapp 200 can be configured to update its user interface if it receives a response from REST API 121 such as to confirm that the request to create a ticket was received. Because User-1 may already be authenticated with web application 120-1, web application 120-1 can immediately handle microapp 200's request. For example, microapp 200 can include a token obtained via single sign-on in the request sent to REST API 121.

As can be seen, by providing microapp 200, User-1 is able to request the creation of a ticket with web application 120-1 by merely interacting with the simple user interface of microapp 200 as opposed to launching a browser, navigating to a domain, authenticating, navigating to the desired functionality, and then invoking the functionality. Microapp 200 can therefore greatly enhance the productivity of User-1 particularly when he or she creates many tickets throughout the day.

Figure 4:
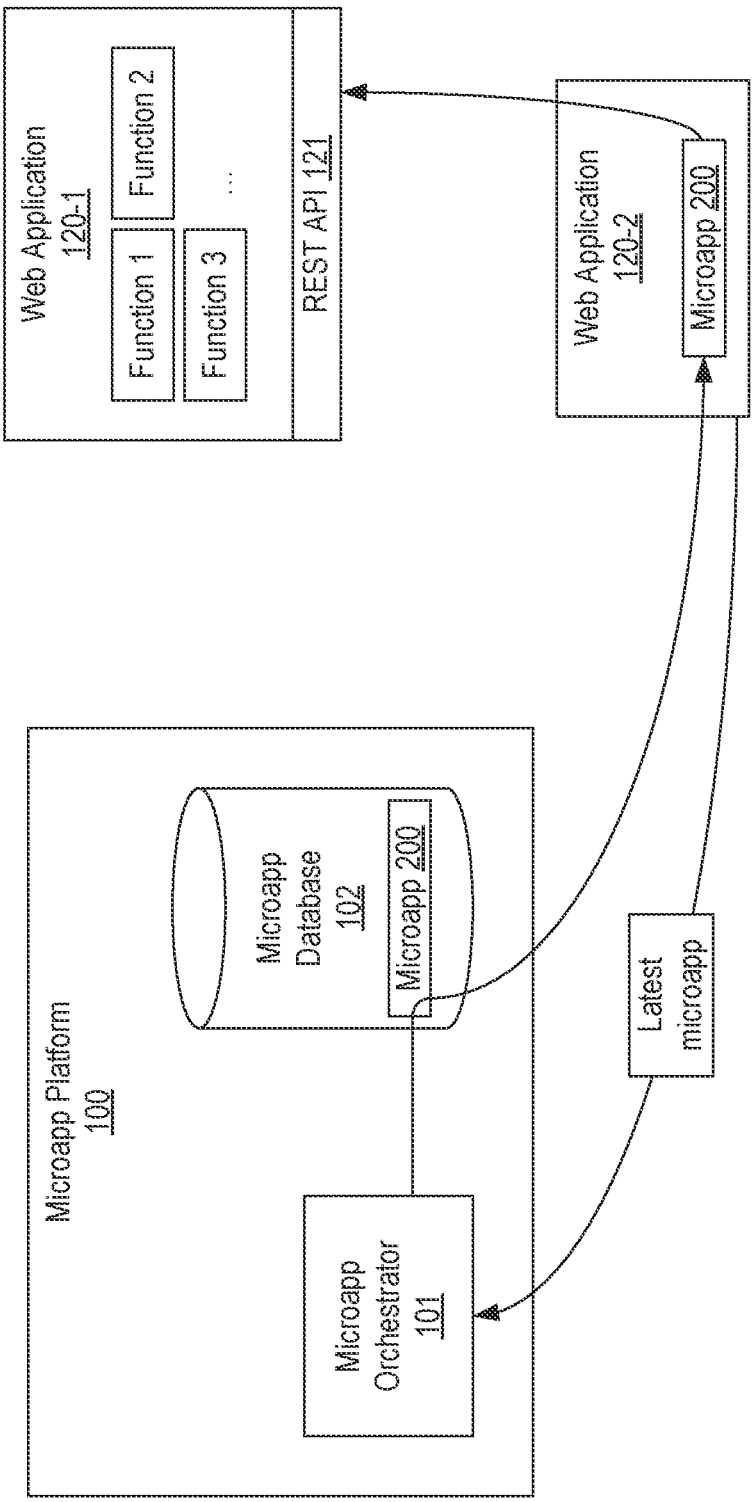
FIG. 4 provides an example of how a web application can integrate a microapp to access functionality of another web application in accordance with embodiments of the present invention.

FIG. 4 provides an example of how microapp 200 could be integrated into another web application such as web application 120-2. For example, the administrator could desire to make the ticket creation functionality of web application 120-1 accessible directly from web application 120-2. However, the administrator may not have direct access to web application 120-2 (e.g., when it is provided by a third party) or may not desire to reconfigure web application 120-2 each time a change is desired. In such cases, web application 120-2 could be configured to interface with microapp orchestrator 101, such as each time web application 120-2 is loaded, to obtain the current version of microapp 200. Web application 120-2 can then plug microapp 200 into its interface to thereby allow the user to create tickets in web application 120-1 without leaving the interface of web application 120-2. In some embodiments, the version of microapp 200 that is provided to web application 120-2 could be dictated by the user that is logged in to web application 120-2.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for providing access to functionality of a web application via microapps, the method comprising:
receiving user interface creation input for defining a user interface of a first microapp;
receiving input that defines an association between one or more elements of the user interface of the first microapp and a first function of a first web application that is accessible via an interface of the first web application;
creating the first microapp by storing the user interface of the first microapp and the association between the one or more elements of the user interface of the first microapp and the first function of the first web application; and
deploying the first microapp to a first user computing device to thereby allow a first user of the first user computing device to access the first function of the first web application by selecting the one or more elements of the user interface of the first microapp.

2. The method of claim 1, wherein the user interface creation input comprises HTML.

3. The method of claim 1, wherein the one or more elements of the user interface comprise a button that when selected accesses the first function of the first web application.

4. The method of claim 1, further comprising:
receiving input that assigns the first microapp to the first user; and
associating the first microapp with the first user.

5. The method of claim 4, wherein the first microapp is deployed to the first user computing device in response to the first user logging in to the first user computing device.

6. The method of claim 1, wherein deploying the first microapp to the first user computing device comprises integrating the first microapp into a workspace deployed to the first user computing device.

7. The method of claim 6, wherein integrating the first microapp into the workspace comprises integrating the user interface of the first microapp into the workspace.

8. The method of claim 1, wherein the interface of the first web application is a REST API.

9. The method of claim 1, wherein the user interface of the first microapp is a single webpage.

10. The method of claim 1, further comprising:
receiving additional user interface creation input for defining a user interface of a second microapp;
receiving input that defines an association between one or more elements of the user interface of the second microapp and the first function of the first web application;
creating the second microapp by storing the user interface of the second microapp and the association between the one or more elements of the user interface of the second microapp and the first function of the first web application; and
deploying the second microapp to a second user computing device to thereby allow a second user of the second user computing device to access the first function of the first web application by selecting the one or more elements of the user interface of the second microapp.

11. The method of claim 1, further comprising:
receiving additional user interface creation input for defining a user interface of a second microapp;
receiving input that defines an association between one or more elements of the user interface of the second microapp and a second function of the first web application;
creating the second microapp by storing the user interface of the second microapp and the association between the one or more elements of the user interface of the second microapp and the second function of the first web application; and
deploying the second microapp to a second user computing device to thereby allow a second user of the second user computing device to access the second function of the first web application by selecting the one or more elements of the user interface of the second microapp.

12. The method of claim 1, further comprising:
receiving additional user interface creation input for defining a user interface of a second microapp;
receiving input that defines an association between one or more elements of the user interface of the second microapp and the first function of the first web application;
creating the second microapp by storing the user interface of the second microapp and the association between the one or more elements of the user interface of the second microapp and the first function of the first web application; and
deploying the second microapp to a second web application to thereby allow the first function of the first web application to be accessed from a user interface of the second web application.

13. The method of claim 1, wherein the first microapp is configured such that, when the one or more elements are selected, the first microapp sends a request to the first web application via the interface and includes an authentication token in the request.

14. One or more computer storage media storing computer executable instructions which when executed implement a method for providing access to functionality of a web application via microapps, the method comprising:
receiving user interface creation input for defining a user interface of a first microapp;
receiving input that defines an association between an element of the user interface of the first microapp and a first function of a first web application that is accessible via a REST API of the first web application;
creating the first microapp by storing the user interface of the first microapp and the association between the element of the user interface of the first microapp and the first function of the first web application; and
deploying the first microapp to a first user computing device to thereby allow a first user of the first user computing device to access the first function of the first web application by selecting the element of the user interface of the first microapp.

15. The computer storage media of claim 14, wherein the element is a button.

16. The computer storage media of claim 15, wherein the first microapp is configured to leverage a single sign-on to include an authentication token in a request sent to the first web application via the REST API when the button is selected.

17. The computer storage media of claim 14, wherein the method further comprises:
   integrating the first microapp into a workspace displayed on the first user computing device.

18. The computer storage media of claim 14, wherein the method further comprises:
   receiving additional user interface creation input for defining a user interface of a second microapp;
   receiving input that defines an association between an element of the user interface of the second microapp and a function of a second web application;
   creating the second microapp by storing the user interface of the second microapp and the association between the element of the user interface of the second microapp and the function of the second web application; and
   deploying the second microapp to a third web application to thereby allow the function of the second web application to be accessed from a user interface of the third web application.

19. A system comprising:
   a microapp platform that includes a microapp orchestrator and a microapp database; and
   a plurality of user computing devices;
   wherein the microapp orchestrator is configured to perform a method for providing access to functionality of one or more web applications via microapps, the method comprising:
      receiving user interface creation input for defining a user interface of a first microapp;
      receiving input that defines an association between one or more elements of the user interface of the first microapp and a first function of a first web application that is accessible via an interface of the first web application;
      creating the first microapp by storing the user interface of the first microapp and the association between the one or more elements of the user interface of the first microapp and the first function of the first web application; and
      deploying the first microapp to a first user computing device of the plurality of user computing devices to thereby allow a first user of the first user computing device to access the first function of the first web application by selecting the one or more elements of the user interface of the first microapp.

20. The system of claim 19, wherein deploying the first microapp to the first user computing device comprises integrating the first microapp in a workspace deployed on the first user computing device.

* * * * *